United States Patent [19]
Oaks

[11] Patent Number: 5,536,532
[45] Date of Patent: Jul. 16, 1996

[54] PAINTED POLYVINYL CHLORIDE ARTICLES AND PROCESS FOR PRODUCING THE SAME

[76] Inventor: Robert E. Oaks, 8251 Youngstown-Salem Rd., Canfield, Ohio 44406

[21] Appl. No.: 167,697

[22] Filed: Dec. 15, 1993

Related U.S. Application Data

[63] Continuation-in-part of Ser. No. 975,875, Nov. 13, 1992, abandoned.

[51] Int. Cl.[6] .............................. B05D 3/04; B05D 3/10; B05D 3/12
[52] U.S. Cl. .................. 427/307; 427/322; 427/393.5
[58] Field of Search ............................ 427/307, 322, 427/393.5

[56] References Cited

U.S. PATENT DOCUMENTS

| | | | |
|---|---|---|---|
| 2,209,940 | 9/1940 | Smith | 427/322 |
| 2,999,764 | 9/1961 | Rhoads | 427/322 X |
| 4,770,905 | 9/1988 | Silbermann et al. | 527/331 X |

*Primary Examiner*—Michael Lusignan
*Attorney, Agent, or Firm*—Clifford A. Poff

[57] ABSTRACT

A painted article and a method of producing the same provides that the substrate consisting of polyvinyl chloride is adhered to a paint film selected from the group consisting of polyurethane, acrylic enamel, lacquer and water soluable organic coating is adhered to the substrate while under the residual chemical influence caused by a wetted layer of liquid lacquer material.

17 Claims, 2 Drawing Sheets

PAINTED POLYVINYL CHLORIDE ARTICLES AND PROCESS FOR PRODUCING THE SAME

CROSS REFERENCE TO RELATED APPLICATION

This application is a Continuation-In-Part of U.S. patent application Ser. No. 07/975,875, filed Nov. 13, 1992, now abandoned.

BACKGROUND OF THE INVENTION

1. Field of the Invention

The present invention relates to specially coated vinyl extrusions, molding or other articles having a predetermined shape or form to enhance the aesthetic appearance as well as the useful purpose of the vinyl article. More particularly, the present invention provides for coating such an article as by a paint film on a polyvinyl chloride substrate after conditioning of a vinyl material by the temporary presence of a volatile agent to cause adherence of the coating material which is otherwise impervious to adherence to the polyvinyl chloride material of the substrate.

2. Description of the Prior Art

Polyvinyl chloride material has been used extensively for a number of years to form an extrusion, molding or other form, particularly such material having been mixed before the extrusion process with suitable plastizers so that the extrusion is rigid and immobile. Articles can also be formed by molding or other well known shaping techniques. The vinyl material may also include pigment additives for the desired color which always perminates the entire volume of the vinyl. Uniform coloration applied to such vinyl is difficult to control because the entire volume of the vinyl is effected by the color pigment that can vary from time to time depending upon the completeness of mixing and as well as the variables effecting composition of the vinyl and local conditions affecting the moldings, shaping, extruding of the vinyl.

While not so limited, the present invention is particularly useful for extruded shapes of polyvinyl chloride material commonly produced as a stock for the production of frame structures for housing windows. These well known commonly produced vinyl extrusions are white and some times pigments are added so that a bronze coloration is imparted to the extrusion. After the window structure has been formed from such extrusion stock, it has been widely accepted that the vinyl surface is impervious to all forms of coatings including paints that might otherwise enhance the aesthetic appearance of the article including discontinuities to the color.

Attempts to coat polyvinyl chloride articles have, so far as known, not met with success but include roughing the vinyl surface with abrasives to combat the high surface tension. While not completely understood, it is believed that the polyvinyl chloride material resists adhering or bonding a paint film because of the chemical inert and extremely low surface energy properties of the vinyl. It is also believed the usefulness of rigid polyvinyl chloride plastic materials can be materially enhanced by an ability to apply a coating, such as a paint film, to the material.

It is therefore a most important object of the present invention to provide a coating on a polyvinyl chloride material in which the coating is adhered to the vinyl material to give the resultant painted article with excellent resistance to peeling and shear strength without the necessity of adding coloration pigments to the vinyl material before extruding or other forming operations as heretofore thought necessary for coloring polyvinyl chloride materials.

A further object of the present invention is to enable bonding of a decorative coating during a brief time window of opportunity during which a temporarily modified surface of the vinyl is caused by a treatment with a liquid so as to be receptive to the coating material.

SUMMARY OF THE INVENTION

More particularly according to the present invention there is provided a method of printing an article, the method including the steps of selecting a substrate having a polyvinyl chloride surface normally impervious to the adherence of paint film, wetting the polyvinyl chloride surface with a liquid lacquer retarder in an amount to form a thin film under an applied pressure, allowing the retarder to react with the polyvinyl chloride surface, applying a paint film to the reacted surface of the polyvinyl chloride surface, the paint film being selected from the group consisting of polyurethane, acrylic enamel, lacquer, and a water soluable organic coating, and allowing the paint film to dry while the residual of the liquid lacquer retarder vaporizes.

The present invention according to another aspect provides a painted article comprising a polyvinyl chloride substrate having a paint receiving surface containing an residual amount of liquid lacquer retarder effective to adhere a paint film selected from the group consisting of polyurethane, acrylic enamel, lacquer and water soluble organic coatings, said residual amount of liquid lacquer retarder being formed from a residue of wetting film of said liquid lacquer retarder on said pain receiving surface.

BRIEF DESCRIPTION OF THE DRAWINGS

The present invention will be more fully understood when the following detailed description is read in light of the accompanying drawings in which.

DETAILED DESCRIPTION OF THE PREFERRED EMBODIMENTS

Figure 1:
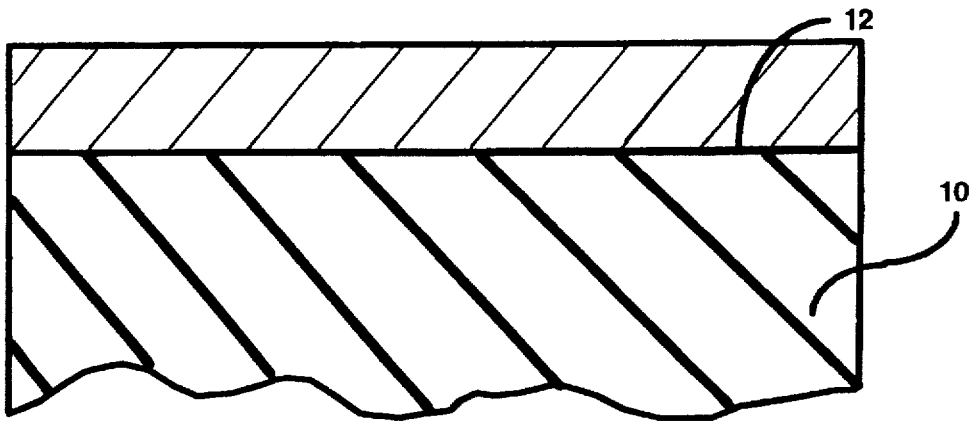
FIG. 1 is a sectional view of an initial step to carry out the method of the present invention to form the painted article produced thereby.
Figure 2:
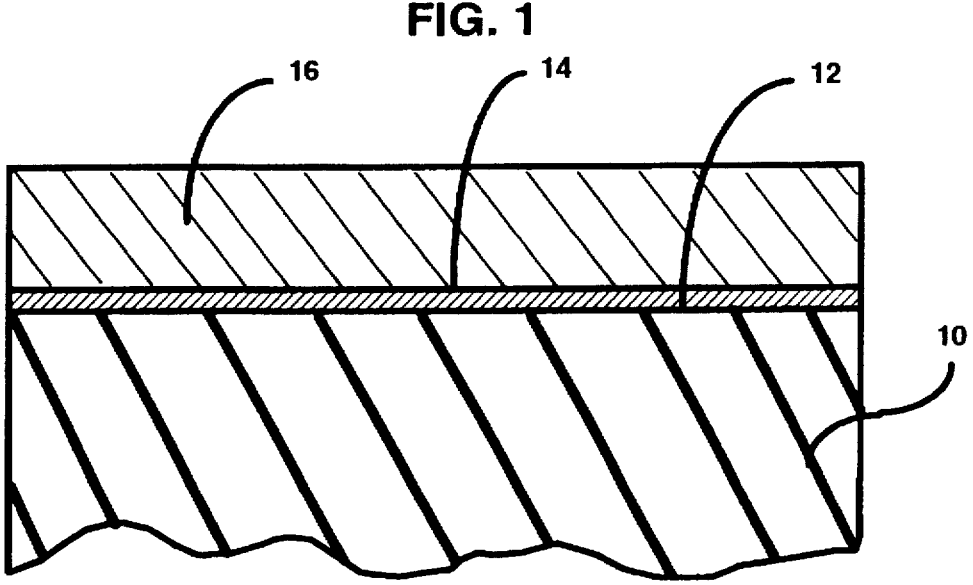
FIG. 2 is a sectional view similar to FIG. 1 and illustrating the application of a paint film to the treated surface of the article.
Figure 3:
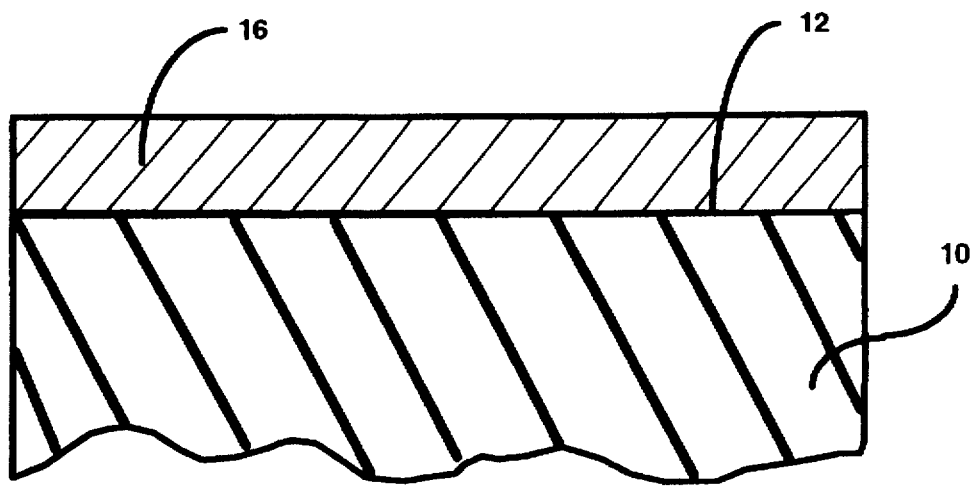
FIG. 3 is a sectional view of a painted article according to the present invention.

In FIGS. 1–3 there are illustrated a sequence of events according to the method of the present invention to produce a painted polyvinyl chloride article. In FIG. 1 there is a initially selected an article 10 that may consist entirely of or at least present a substrate consisting of polyvinyl chloride material. Vinyl-chloride polymers and copolymers can be divided into six types: (1) general-purposes resins, high-molecular-weight resins used in plasticized form for most applications; (2) dispersion resins, high-molecular-weight resins of small particle size suitable for dispersion in plasticizer, as plastisols and organosols; (3) water-dispersed resins, latexes; (4) solution-type resins, lower molecular-weight resins or copolymers which will dissolve in organic solvents; (5) nitrile rubber plasticized resins, polyblends; (6) rigid resins, copolymers or high-molecular-weight resins designed for unplasticized applications. The present invention finds particularly utility within this group of vinyls in the general purpose resin and rigid resin types. It is to be understood that the present invention is applicable to a coating applied to a vinyl substrate not to a pigment and thus the vinyl substrate must have a solid form sufficient to form a substrate.

The surface 12 is cleaned, if necessary, of foreign contaminants and for this purpose any suitable well known cleaning operation may be carried out to produce a contaminate free polyvinyl chloride substrate surface. To the surface 12 there is applied as an initial step, according to the present invention, a film of a liquid consisting essentially of lacquer retarder. It has been found that lacquer retarders are commercially available in the industry from the following: Sherwin Williams; Dupont 3979S Lacquer Retarder; Rinshed Mason Paint Company 883 Alph-Cryl Retarder; Ditizler and Martin Senour Paints 8840 Universal Retarder. It is essential that the retarder be selected with a product designated as a lacquer retarder, i.e., a retarder suitable for use with lacquer paints but not a retarder for use with enamel paints. It has been found that the retarder, after application as a thin film wetting the substrate and allowed to persist under near standard conditions for about 60 seconds, touch time is about unchanged, cure time is preferably about 24 hours. The effect produced or underlying theory is not known and therefore the underlying principle or explanation regarding the operation of the retarder can not be given which causes these surprising results forming the discovery of the present invention.

A preferred liquid lacquer retarder is sold by Sherwin Williams under product designation number R7K6251 as a Universal Retarder and includes Toluene, N-butyl Acetate, 2-Butoxyethyl Acetate and 1-Methoxy-2-Propanol Acetate. The product has a weight of 7.58 pounds per gallon with a total volatile organic compounds of 7.8 pounds per gallon. The product has a flash point of 40° F. and bears a flammable classification. It is therefore necessary to collect the vapors emitting from the polyvinyl chloride surface in a fire safe manner. The painted polyvinyl chloride article is not restricted to the selection of lacquer paint. The discovery that such retarder liquids impart a condition when brought into intimate contact with polyvinyl chloride material rendering at receptive to any of a group of paint films. It is further discovered that the adherence to such a paint film is of a bonding quality that is of long continued integrity free of blistering and not subject to attack by substances or conditions that the paint film adhered thereto are resistant to. It has been found that the polyvinyl chloride surface is rendered receptive to tight bonding of a paint film by wetting with the liquid lacquer retarder in a manner to assure complete wetting so that the entire polyvinyl chloride surface is uniformly treated by the retarder. In this regard, the retarder is preferably pressed into contact with the polyvinyl chloride surface as, for example, by saturating a applicator cloth with the retarder liquid and rubbing the polyvinyl chloride surface with the saturated cloth under pressure sufficient to achieve wetting of the entire polyvinyl chloride surface. Pressure required for this purpose is moderate to light but should be efficient to assure that only a thin film thickness of retarder remains after action by the applicator cloth.

Alternative measures for applying the lacquer retarder include spraying under sufficient conditions to cause the retarder sprays to impact with the polyvinyl chloride surface to establish uniform intimate contact therewith. A sponge or other suitable applicator, which is not necessarily porous, such as a squeegee, is also suitable for applying the lacquer retarder. The thickness of the retarder film is not particularly critical, however, it should be sufficiently thin and free of puddling so that in ordinary operating conditions, the retarder film will undergo substantially complete vaporization within a short time period, usually 30 to 60 seconds, so as to accommodate acceptable production rates and at the same time assure that the polyvinyl chloride surface remains affected by the chemical action caused by the intimate contact with the lacquer retarder material. This condition is depicted in FIG. 2 wherein chemically treated polyvinyl chloride surface occurring when the retarder is substantially completely vaporized and denoted by reference numeral 14 and is a necessary condition for the adherence of a liquid layer comprising a paint film 16 to the polyvinyl chloride substrate 10. The paint film is preferably applied to the treated substrate while the paint is at a temperature of between 70° F. and 100° F. The paint film is suitable selected from the group consisting of polyurethane, acrylic enamel, acrylic lacquer and water soluble organic coatings including urethane water borne latex and acrylic latex. Such water soluble organic coatings are to be applied only after the paint receiving surface of the substrate no longer exhibits a "wet" appearance following the application of the retarder. The paint receiving substrate must be free of all retarder in liquid form having only the non-liquid residue of the thoroughly wetted retarder residue when applying the water soluble organic coating to avoid possible marring of the subsequently applied paint film. When using a paint film belonging to the group of polyurethane, acrylic enamel and acrylic lacquer, it was found that small quantities of retarder in liquid form can be tolerated on the substrate without an adverse effect to the subsequently applied paint film. Residue quantities of retarder freely vaporize during the drying process by the paint. Upon drying of the paint including curing, so far as presently known, but without the aid of chemical analysis, there is no decernable alloying at the interface between the paint film and the polyvinyl chloride substrate. Thus, as shown in FIG. 3, the painted article of the present invention is made up of a dry paint film 16 of the substrate 10.

Figure 4:
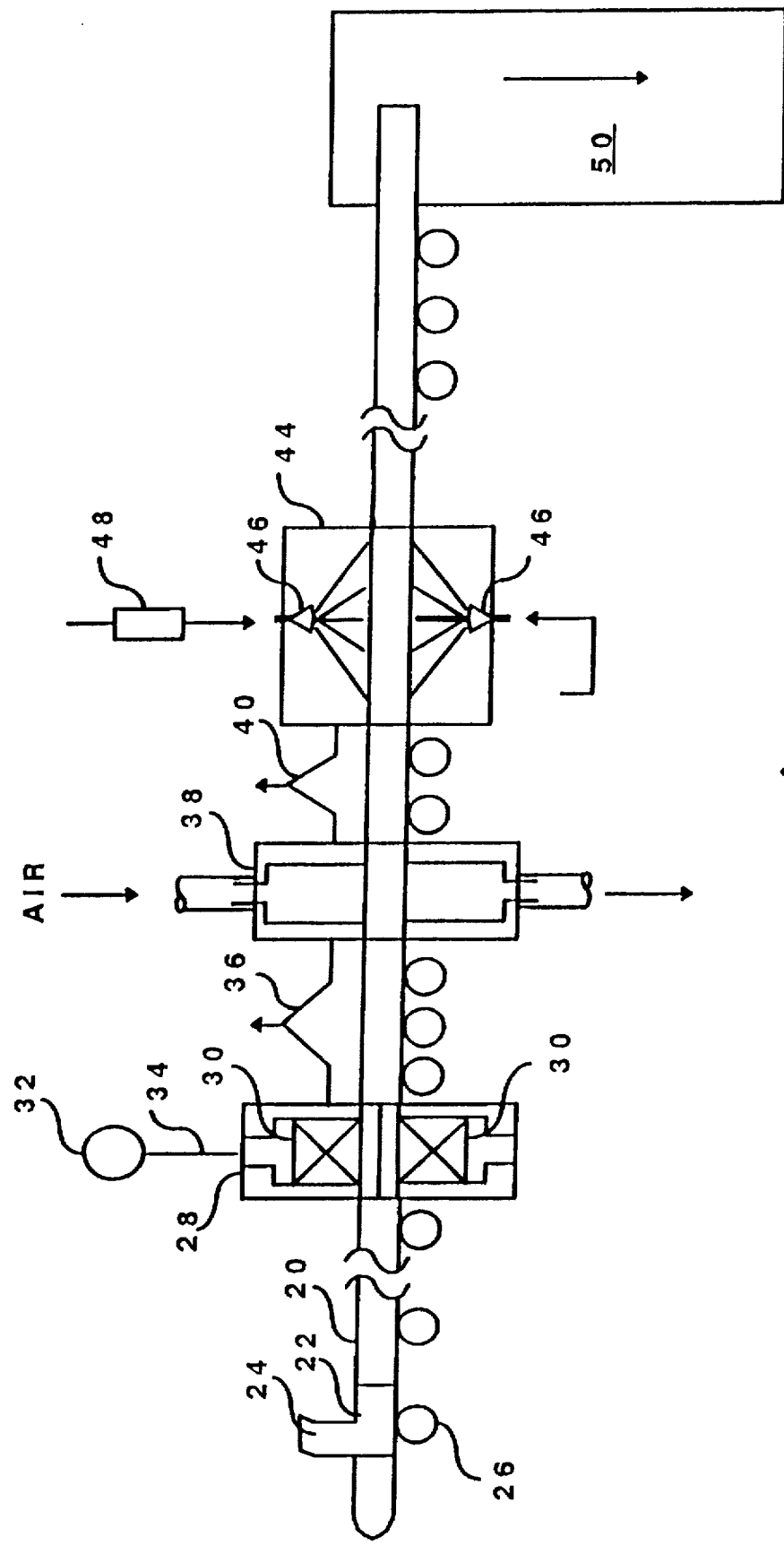
FIG. 4 is a schematic illustration of the painting line for an extruded article of the polyvinyl chloride.

In FIG. 4 there is illustrated schematically a polyvinyl chloride extrusion installation wherein an extrusion 20 having a predetermined shape of a polyvinyl chloride material emerges from a die 22 of an extruding press 24. The article may take the form of a tubular product or a structural section having any of many well known forms for use in the construction of uses for such products made of polyvinyl chloride. The extrusion 20 may be cut to suitable lengths on a run-out table 26 or if desired it may be subject to the painting process of the present invention and thereafter sub-divided into suitable lengths for handling purposes. Thus, it is to be understood that a processing line utilizing the present invention may effectively paint workpieces that are discrete as well as continuous in nature.

It will be also understood by those skilled in the art that polyvinyl chloride extrusions emerge from the extrusion press at an elevated, e.g. 300° F. It is not necessary to paint such workpieces at a room temperature, but instead it is advantageous to the drying process of volatile in the retarder film and paint to process workpieces at a temperature which is elevated above room temperature. The extruded workpiece is transferred by the run-out table 26 to an applicator shroud 28 wherein a sponge 30 or similar resilient liquid applicator is pressed by a spring into intimate contact with the surface of the polyvinyl chloride substrate which is to receive a paint film.

It is to be understood that it is necessary to treat only all surfaces of the polyvinyl chloride extrusion when all such surfaces are to be painted. The applicator receives a supply of lacquer retarder from a reservoir 32 through line 34. The treated surface of the polyvinyl chloride extrusion emerging from shroud 28 has a thin film of lacquer retarder wetting the entire surface to which it had been applied and passes beneath a fume collection hood 36 while conveyed by a roller table to an air treated chamber 38 wherein a cold air blast is impacted with the wetted surface of the extrusion to remove excess liquid lacquer retarder including puddles thereof so that there emerges from the chamber 38 a surface on the polyvinyl chloride extrusion which is chemically affected by the intimate contact during treated time of usually at least 30 seconds or longer by the retarder for adhesion by a paint film. After emerging from the chamber 38 continued vaporization of the residual quantities of retarder is allowed beneath hood 40. A paint film is then applied to the polyvinyl chloride surface while remaining under the residual chemical influence caused by contact with the liquid lacquer retarder. Paint is applied as shown in enclosed chamber 44 wherein nozzles 46 spray heated paint from a heated paint holding chamber 48 that is thermostatically controlled to maintain the paint at a temperature preferably within 70° to 100° F. A paint film of a desired uniform thickness is applied to the treated surface of the polyvinyl chloride extrusion while chemically affected and possibly also having residual quantities of vapor from the lacquer retarder. Emerging from the paint chamber, the painted extrusion remains out of contact with a support surface for sufficient distance to allow the paint to dry and support without marring at the entry end of a transfer bed 40.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

I claim:

1. A method of painting an article, said method including the steps of:

selecting a substrate having a polyvinyl chloride surface normally impervious to the adherence of a paint film;

wetting said polyvinyl chloride surface with a liquid lacquer retarder consisting essentially of toluene, n-butyl acetate, 2-Butoxyethyl Acetate, and 1-Methoxy-2-Propanol Acetate in an amount to form a thin film under an applied pressure;

allowing said liquid lacquer retarder to react with said polyvinyl chloride surface;

applying a paint film to the reacted surface of said polyvinyl chloride surface; and allowing the paint film to dry while the residual of the liquid lacquer retarder vaporizes.

2. The method according to claim 1 wherein said step of allowing said liquid lacquer retarder to react includes subjecting the thin film of said liquid lacquer retarder wetting the polyvinyl chloride surface to a cold air blast.

3. The method according to claim 1 wherein said substrate is wetted with said liquid lacquer retarder while said substrate has a temperature of about 100° F.

4. The method according to claim 1 wherein said paint film has a temperature of between 70° F. and 100° when applied to the surface of said polyvinyl chloride surface after reacting with said liquid lacquer retarder.

5. The method according to claim 1 wherein said step of applying a paint film is carried out in the presence of residual vapors of said liquid lacquer retarder at said reacted surface.

6. The method according to claim 1 wherein said paint film consists of polyurethane.

7. The method according to claim 1 wherein said paint film consists of acrylic enamel.

8. The method according to claim 1 wherein said paint film consists of lacquer.

9. The method according to claim 1 wherein said paint film consists of a water soluble organic coating.

10. The method according to claim 1 wherein said paint film is selected from the group consisting of: urethane water borne latex and acrylic latex.

11. The method according to claim 1 wherein said substrate consists of vinyl chloride polymers.

12. A method of painting an article, said method including the steps of:

selecting a substrate having a polyvinyl chloride surface normally impervious to the adherence of a paint film;

wetting said polyvinyl chloride surface with a liquid lacquer retarder consisting essentially of toluene, n-butyl acetate, 2-Butoxyethyl Acetate, and 1-Methoxy-2-Propanol Acetate in an amount to form a thin film under an applied pressure;

allowing said liquid lacquer retarder to react with said polyvinyl chloride surface;

applying a paint film to the reacted surface of said polyvinyl chloride surface; and allowing the paint film to dry while the residual of the liquid lacquer retarder vaporizes.

13. The method according to claim 12 wherein said paint film consists of polyurethane.

14. The method according to claim 12 wherein said paint film consists of acrylic enamel.

15. The method according to claim 12 wherein said paint film consists of lacquer.

16. The method according to claim 12 wherein said paint film consists of a water soluble organic coating.

17. The method according to claim 12 wherein said paint film is selected from the group consisting of: urethane water borne latex and acrylic latex.

* * * * *